July 28, 1931.  F. ATHIMON  1,816,067
SERVO BRAKE
Original Filed Sept. 30, 1927   2 Sheets-Sheet 1
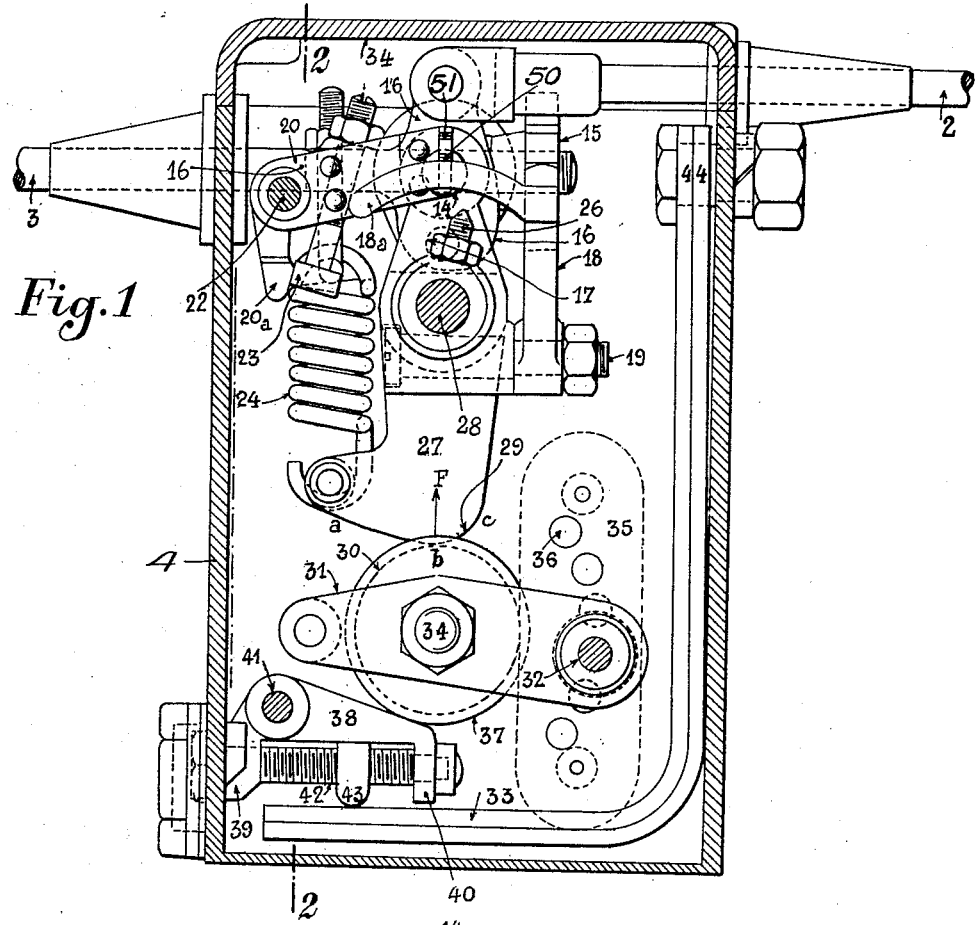
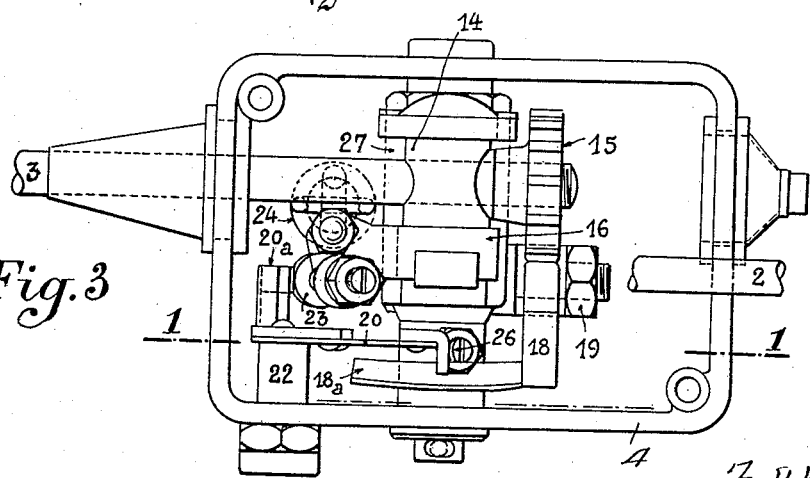
F. Athimon
INVENTOR July 28, 1931.  F. ATHIMON  1,816,067
SERVO BRAKE
Original Filed Sept. 30, 1927   2 Sheets-Sheet 2

F. Athimon
INVENTOR

By: Marks & Clark
Attys.

Patented July 28, 1931

1,816,067

UNITED STATES PATENT OFFICE

FRANCIS ATHIMON, OF PARIS, FRANCE

SERVO-BRAKE

Original application filed September 30, 1927, Serial No. 223,168, and in France October 6, 1926. Divided and this application filed October 29, 1928. Serial No. 315,801.

The present invention which is a division of my copending application No. 223,168 filed September 30, 1927, now patent No. 1,727,742 of September 10, 1929, relates to improvements in the brake control mechanism of the type described in the above mentioned patent application.

An object of the invention is to provide means whereby the maximum braking action may be obtained for variable strokes of the control member operated by the driver of the vehicle.

Another object of the invention is to provide means whereby variable efforts may be exerted on the brakes for a same expansion stroke of the relay spring which contributes with the effort exerted by the driver for applying the brakes.

Further objects and characteristic features of the invention will be apparent from the following description of an embodiment shown, by way of example in the accompanying drawings, in which:

Fig. 1 is a vertical section on the line 1—1 of Figure 3.

Fig. 3 is a plan view of the apparatus with the cover removed.

Figure 2:
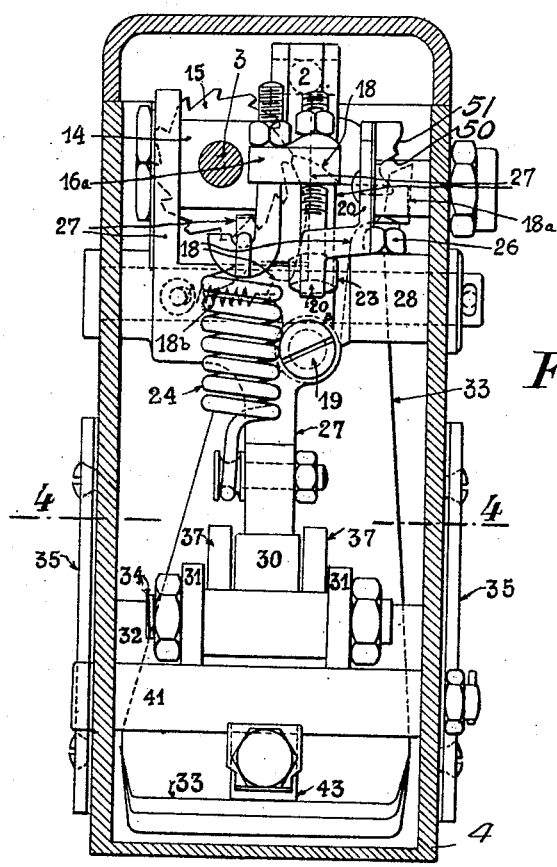
Fig. 2 is a vertical cross section on the line 2—2 of Fig. 1.
Figure 4:
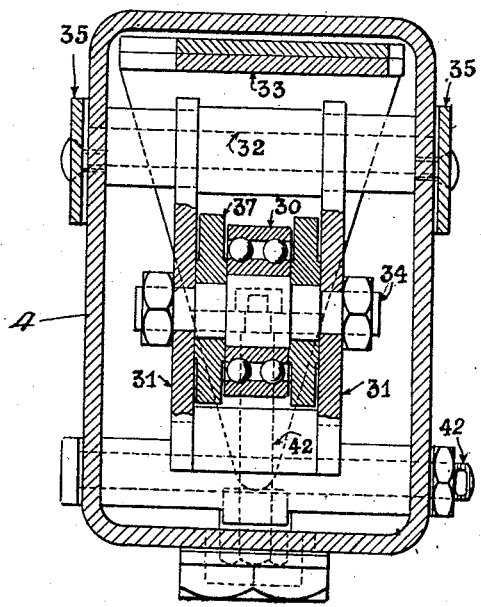
Fig. 4 is a horizontal section on the line 4—4 of Fig. 2.

The apparatus is placed in a casing 4 between the rod 2 leading to the brake pedal and the rod 3 leading to the brake. To the rod 2 is pivoted the lever 16 pivoted at 14 to the lever 27, which is pivotally mounted on the axle 28. The lever 27 comprises at the lower part a cylindrical portion $a\ b$ which is concentric with the axis 28, and an eccentric ramp 29 extending from $b$ to $c$. By means of said cylindrical portion and said ramp, the lever 27 bears upon the roller 30 which is mounted by ball-bearings on the shaft 34 carried by two parallel levers 31 pivoted on the axle 32 which is mounted in two respective holes in two plates 35 secured to the casing 4; said plates are pierced with various holes 36 having the same diameter as the axle 32 and whose centres are situated on an arc of a circle having the axis 34 as a centre. Upon the axle 34 are mounted on the respective sides of the roller 30, two rollers 37 of a somewhat large diameter; said rollers make contact with a lever 38 which comprises two vertical lugs 39—40 and is pivoted on an axle 41 secured to the casing. By means of the screw 42, the slide 43 is movable between the lugs 39 and 40, and it makes contact with the plate spring 33 secured to the casing 4 at 44. The lower end of the lever 16 is slotted in order to limit the motion of the lever 16 with respect to the lever 27 by coacting with the stud 17 on the lever 27.

The operation is as follows:

By the action of the spring 33, the lever 38 is subjected to a couple $C^1$ whose magnitude can be changed, by means of the slide 43, by the displacement of the point of application of the force. Variable efforts may thus be applied on the lever 27 for a same expansion of the spring 33. The lever 38 acts upon the rollers 37 which are subjected to a couple $C^2$ by which the rollers and the levers 31 are pivoted on the axis 32 and to a tangential force by which the rollers 37 are rotated on their axis. The couple $C^2$ is manifested by a force F perpendicular to the surface of contact between the roller 30 and the lever 27; said force produces a couple rotating the lever 27 when it does not pass through the axis 28.

In all positions of the lever 27 between the inoperative position (on the right of the position shown in Figure 1) and the position shown in Figure 1, the point of application of the force is situated between $a$ and $b$. This force passes through the axis 28 and has no effect on the rod 3 but when the lever 27 is further moved to the left (Figure 1), the direction of the force passes through the centres of curvature of the curve $b$—$c$ which differ from the axis 28, so that the lever 27 is subjected to a couple whose moment increases from zero to a maximum value which is attained at the end of the stroke. In this position, the spring 33 is somewhat expanded, but is far from its maximum expansion. For the maximum braking, if T kgs. traction are required for the maximum brake pressure, (T—t) kgs. will be balanced by the action of the spring, and there will remain t kgs. to be furnished by the driver. Since the traction of the rod 3 increases with the displacement of the lever 27 to the left and since the action of the spring is proportional to this displacement, the same proportion between the aid furnished by the spring and the effort to be exerted by the driver will be maintained throughout the entire braking stroke. When the driver ceases his effort, the elastic tension of the brakes will preponderate and will give the spring the tension which it had at the start.

According to the position of the axis 32, I may advance or delay the time at which the roller 37 is brought into contact with the point C of the curve b c corresponding to the maximum braking. It will thus be possible to vary the stroke of the rod 2 and consequently of the pedal or operating lever for obtaining the maximum braking.

The apparatus herein described can be completed to advantage by the device for taking up the wear as in my copending application 223,168. Said device chiefly comprises a ratchet nut 15 which is mounted on the end of the rod 3, and a pawl 18 which is secured by the screw 19 to the lever 27; said pawl is provided with a reaction spring $18^b$ and it comprises an arm $18^a$ of circular arc shape having a bevelled edge which makes contact with the end of an angular lever 20 provided with a ramp 50 and with a locking notch 51 and pivotally mounted at 22. The lever 20 is actuated on the portion $20^a$ by a rod 23 secured to the lever 16.

A spring 24 is connected at one end with an extension of the lever 16 and at the other end with the lever 27. During the inoperative stroke of the said rod-and-link gear, the lever 27, the spring 24, the lever 16 and the rod 23 are bodily pivoted as a whole about the axle 28, and the lower end of said rod 23 slides on the portion $20^a$ of the lever 20 without swinging said lever. When the braking action begins, the lever 16 rotates for a moment about the axle 14 until the right side of the slotted end of the lever 16 bears on the stud 17. The rod 23 presses against the portion $20^a$ of the lever 20 and causes said lever to turn about the axle 22. When the rod-and-link gear is properly adjusted, the ramp 50 presses on the bevel part of the arm $18^a$ and holds it in the locking notch 51 of the lever 20 during the entire braking as far as the inoperative position; at a short distance before reaching said latter position, a stop member 26, carried on the lever 27 raises the upper branch of the lever 20 and disengages the pawl 18 which falls in the same tooth of the ratchet nut. If the rod-and-link gear is not properly adjusted, the lever 27, the spring 24, the lever 16 and the rod 23 will be rotated further about the axle 28 during the inoperative stroke, so that the rod 23 will slide on a greater distance on the portion $20^a$. When the braking action begins, the rod 23 rotating about the axle 14 slides on the remaining portion of the projection $20^a$ and rotates the lever 20, but said remaining portion being insufficient, the rod 23 falls beyond said projection before the upper branch of the lever 20 has brought the locking notch 51 opposite the bevel of the arm $18^a$. The pawl 18 falls thus again on the ratchet nut, rotates with the lever 27, engages the following tooth of the ratchet nut 15, and during the return stroke of the brakes to the inoperative position, screws the ratchet nut for one tooth, thus taking up the excessive play.

Obviously, the said invention is not limited to the details of construction herein described and represented by way of example.

Having now described my invention, what I claim as new and desire to secure by Letters Patent is:

1. In a brake control mechanism, the combination of a control member adapted to be moved by an operator, a reacting member, a stationary pivot, a connecting member pivoted to said control member, to said reacting member and to said stationary pivot, a cam surface on said connecting member, a pivoting axle, a rocking arm pivoted on said pivoting axle and adapted to bear on said cam surface, a spring adapted to urge said rocking arm against said cam surface and means adapted to hold said pivoting axle in different positions, whereby said rocking arm is adapted to bear on variable portions of said cam for a given position of said control member.

2. In a brake control mechanism, the combination of a control member adapted to be moved by an operator, a reacting member, a stationary pivot, a connecting member pivoted to said control member, to said reacting member and to said stationary pivot, a cam surface on said connecting member, a pivoting axle, a rocking arm pivoted on said pivoting axle and adapted to bear on said cam surface, a stationary stud, a lever pivoted on said stationary stud and adapted to bear on said rocking arm, a contact piece adjustably mounted on said lever and a spring bearing on said contact piece and adapted to urge said lever against said rocking arm and said rocking arm against said cam surface, whereby variable efforts may be exerted on said rocking arm and on said cam surface for a same expansion stroke of said spring.

3. In a brake control mechanism, the combination of a control member adapted to be moved by an operator, a reacting member, a stationary pivot, a connecting member pivoted to said control member, to said reacting member and to said stationary pivot, a cam surface on said connecting member, a pivoting axle, a rocking arm pivoted on said pivoting axle and adapted to bear on said cam surface, a stationary stud, a lever pivoted on said stationary stud and adapted to bear on said rocking arm, a screw carried by said pivoting lever, a slide adjustably mounted on said screw and a spring bearing on said slide and adapted to urge said lever against said rocking arm and said rocking arm against said cam surface, whereby variable efforts may be exerted on said rocking arm and on said cam surface for a same expansion stroke of said spring.

4. In a brake control mechanism, the combination of a casing, a stationary pivot in said casing, a connecting member in said casing pivoted on said stationary pivot, a cam surface on said connecting member, a control member pivoted on said connecting member, a reacting member pivoted to said connecting member, a flat tensioned spring disposed on the inner side of said casing, and means interposed between said spring and said cam surface and adapted to transmit the tension of said spring to said connecting member.

In testimony whereof I have signed my name to this specification.

FRANCIS ATHIMON.